(12) United States Patent
Park

(10) Patent No.: US 12,528,444 B2
(45) Date of Patent: Jan. 20, 2026

(54) BRAKE APPARATUS AND METHOD OF CONTROLLING THE SAME

(71) Applicant: HL MANDO CORPORATION, Gyeonggi-do (KR)

(72) Inventor: Byoungjin Park, Gyeonggi-do (KR)

( * ) Notice: Subject to any disclaimer, the term of this patent is extended or adjusted under 35 U.S.C. 154(b) by 153 days.

(21) Appl. No.: 18/380,159

(22) Filed: Oct. 14, 2023

(65) Prior Publication Data

US 2024/0278753 A1  Aug. 22, 2024

(30) Foreign Application Priority Data

Feb. 21, 2023  (KR) ........................ 10-2023-0023108

(51) Int. Cl.
*B60T 8/175* (2006.01)
*B60T 8/171* (2006.01)
*B60T 8/88* (2006.01)

(52) U.S. Cl.
CPC .............. *B60T 8/175* (2013.01); *B60T 8/171* (2013.01); *B60T 8/885* (2013.01); *B60T 2210/20* (2013.01); *B60T 2250/00* (2013.01); *B60T 2270/416* (2013.01)

(58) Field of Classification Search
CPC .......... B60T 8/175; B60T 8/171; B60T 8/885; B60T 2210/20; B60T 2250/00; B60T 2270/416; B60T 8/172; B60T 13/66; B60T 2270/206; B60T 8/24; B60T 17/221; B60Y 2400/3032; B60Y 2400/81
USPC ........................................................ 701/83
See application file for complete search history.

(56) References Cited

FOREIGN PATENT DOCUMENTS

| CN | 107074218 A | * | 8/2017 | ................ B60T 7/12 |
|---|---|---|---|---|
| KR | 10-0208594 | | 7/1999 | |
| KR | 10-0957632 | | 5/2010 | |
| KR | 20190015859 A | * | 2/2019 | |

* cited by examiner

*Primary Examiner* — Lindsay M Low
*Assistant Examiner* — Omar Morales
(74) *Attorney, Agent, or Firm* — WOMBLE BOND DICKINSON (US) LLP

(57) ABSTRACT

A brake apparatus includes a brake configured to provide a braking torque to first and second wheels of a vehicle, and a processor configured to identify a driving torque of the vehicle based on an output of an engine of the vehicle, identify a reference driving torque based on a longitudinal acceleration of the vehicle, identify a spin of at least one wheel of the first and second wheels based on determination that the driving torque identified based on the output of the engine of the vehicle is greater than the reference driving torque identified based on the longitudinal acceleration of the vehicle, and control the brake to provide the braking torque to the at least one wheel in response to the identified spin of at least one wheel of the first and second wheels.

20 Claims, 7 Drawing Sheets

BRAKE APPARATUS AND METHOD OF CONTROLLING THE SAME

CROSS-REFERENCE TO RELATED APPLICATION

This application claims the benefit of Korean Patent Application No. 10-2023-0023108, filed on Feb. 21, 2023 in the Korean Intellectual Property Office, the disclosure of which is incorporated herein by reference in its entirety.

BACKGROUND

1. Technical Field

The present disclosure generally relates to an apparatus and method for controlling a brake of a vehicle. More particularly, some embodiments of the present disclosure relate to a brake apparatus including a brake traction control system (BTCS) and a method of controlling the same.

2. Description of the Related Art

Vehicles are essentially equipped with a brake for performing braking, and brake control modules for controlling the brake in various methods have been proposed for the safety of drivers and passengers.

Recently, traction control systems (TCSs) for increasing a traction force have been developed and provided on vehicles. The TCSs for the vehicles control a driving torque provided to wheels to prevent, suppress, or minimize spins (or slips) of the wheels.

In addition, a brake traction control system (BTCS) for increasing the traction force of the vehicle is provided on the vehicle. The BTCS may control braking torques of the wheels in order to prevent left-right asymmetrical spins of the wheels caused by a non-uniform friction coefficient (split u) of a road surface.

SUMMARY

Therefore, it is an aspect of the present disclosure to provide an apparatus capable of preventing, suppressing, or minimizing left-right asymmetrical spins of wheels in a state in which a wheel speed sensor is out of order, inoperable, or in an abnormal state, and a method of controlling the same.

Additional aspects of the disclosure will be set forth in part in the description which follows and, in part, will be obvious from the description, or may be learned by practice of the disclosure.

In accordance with one aspect of the present disclosure, a brake apparatus includes a brake configured to provide a braking torque to a first wheel of a vehicle and a second wheel of the vehicle, and a processor configured to identify a reference driving torque of the vehicle corresponding to a longitudinal acceleration of the vehicle, identify a spin of at least one wheel of the first wheel or the second wheel based on a driving torque, which is identified based on an output signal of an engine control module of the vehicle, being greater than the reference driving torque corresponding to the longitudinal acceleration, and control the brake to provide the braking torque to the at least one wheel in response to the spin of the at least one wheel.

The processor may control the brake to provide a braking torque, which is corresponding to the identified driving torque and the reference driving torque of the vehicle, to the at least one wheel.

The processor may identify a slope of a road on which the vehicle travels based on a vertical acceleration of the vehicle, and identify the reference driving torque of the vehicle corresponding to the slope of the road and the longitudinal acceleration.

The processor may control the brake to provide a braking torque, which is corresponding to the longitudinal acceleration at the slope of the road, to the at least one wheel in response to the spin of the at least one wheel.

The processor may identify a failure of a first wheel speed sensor based on a first signal output from the first wheel speed sensor associated with the first wheel, identify a rotating speed of the second wheel based on a second signal output from a second wheel speed sensor associated with the second wheel, and identify the spin of the at least one of the first wheel or the second wheel based on whether the second wheel spins.

The processor may identify the spin of the first wheel based on the driving torque of the vehicle being greater than the reference driving torque, when the spin of the second wheel is not identified based on the second signal output from the second wheel speed sensor.

The processor may control the brake to provide a braking torque, which is corresponding to the identified driving torque and the reference driving torque of the vehicle, to the first wheel.

The processor may control the brake to provide a braking torque, which is corresponding to the spin of the second wheel, to the second wheel when identifying the spin of the second wheel based on the second signal.

In accordance with another aspect of the present disclosure, a method of controlling a brake apparatus including a brake configured to provide a braking torque to a first wheel of a vehicle and a second wheel of the vehicle includes identifying a reference driving torque of the vehicle corresponding to a longitudinal acceleration of the vehicle, identifying a spin of at least one wheel of the first wheel or the second wheel based on a driving torque, which is identified based on an output signal of an engine control module of the vehicle, being greater than the reference driving torque corresponding to the longitudinal acceleration, and controlling the brake to provide the braking torque to the at least one wheel in response to the spin of the at least one wheel.

The method may further include controlling the brake to provide a braking torque, which is corresponding to the identified driving torque and the reference driving torque of the vehicle, to the at least one wheel.

The identifying of the reference driving torque of the vehicle may include identifying a slope of a road on which the vehicle travels based on a vertical acceleration of the vehicle, and identifying the reference driving torque of the vehicle corresponding to the slope of the road and the longitudinal acceleration.

The method may further include controlling the brake to provide a braking torque, which is corresponding to the longitudinal acceleration at the slope of the road, to the at least one wheel in response to the spin of the at least one wheel.

The identifying of the spin of the at least one of the first wheel or the second wheel may include identifying a failure of a first wheel speed sensor based on a first signal output from the first wheel speed sensor associated with the first wheel, identifying a rotating speed of the second wheel based on a second signal output from a second wheel speed sensor associated with the second wheel, and identifying the spin of the at least one of the first wheel or the second wheel based on whether the second wheel spins.

The identifying of the spin of the at least one of the first wheel or the second wheel may further include identifying the spin of the first wheel based on the driving torque of the vehicle being greater than the reference driving torque, when the spin of the second wheel is not identified based on the second signal output from the second wheel speed sensor.

The method may further include controlling the brake to provide a braking torque, which is corresponding to the driving torque and the reference driving torque of the vehicle, to the first wheel.

The method may further include controlling the brake to provide a braking torque, which is corresponding to the spin of the second wheel, to the second wheel when the spin of the second wheel is identified based on the second signal.

In accordance with still another aspect of the present disclosure, a brake apparatus includes a brake configured to provide a hydraulic pressure to a first wheel cylinder associated with a first wheel of a vehicle and a second wheel cylinder associated with a second wheel of the vehicle, and a processor configured to identify that a failure has occurred in a first wheel speed sensor based on a first signal output from the first wheel speed sensor associated with the first wheel, identify a rotating speed of the second wheel based on a second signal output from a second wheel speed sensor associated with the second wheel, identify a reference speed of a drive wheel of the vehicle based on an output signal of an engine control module of the vehicle, identify a spin of the first wheel based on the rotating speed of the second wheel and the reference speed of the drive wheel, and control the brake to provide the hydraulic pressure to the first wheel cylinder associated with the first wheel in response to the spin of the first wheel.

The processor may identify the spin of the first wheel based on the rotating speed of the second wheel being lower than the reference speed of the drive wheel, when a spin of the second wheel is not identified based on the second signal.

The processor may identify a slope of a road on which the vehicle travels based on a vertical acceleration of the vehicle, and control the brake to apply a braking torque corresponding to the longitudinal acceleration of the vehicle at the slope of the road to the first wheel.

The processor may control the brake to apply a braking torque, which is corresponding to the spin of the second wheel, to the second wheel when identifying the spin of the second wheel based on the second signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
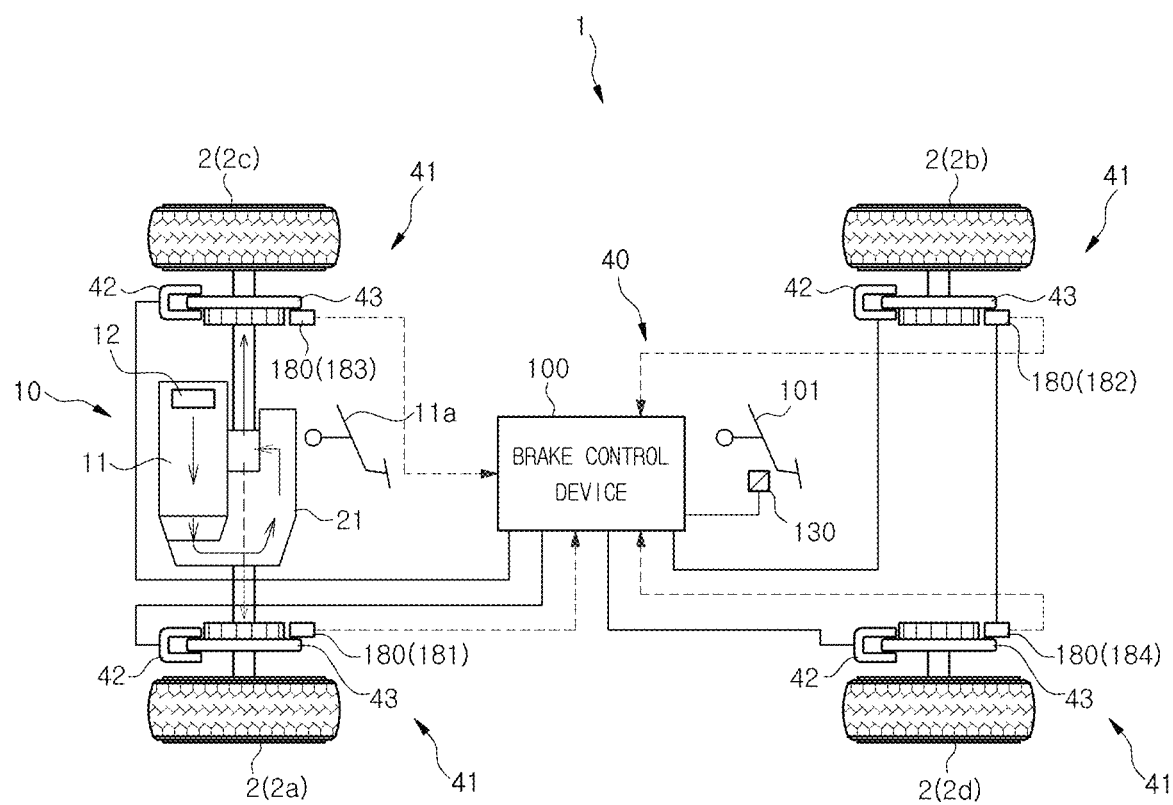
FIG. 1 illustrates a drive system and a brake system included in a vehicle according to an embodiment of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 illustrates a drive system and a brake system included in a vehicle according to an embodiment of the present disclosure.

A vehicle 1 includes a body forming an exterior and accommodating a driver and/or luggage, a chassis including components of the vehicle 1 other than the body, and wheels 2 for rotating so that the vehicle 1 may move. For example, the wheels 2 may include a first wheel 2a provided at a front left side of the vehicle 1, a second wheel 2b provided at a rear right side of the vehicle 1, a third wheel 2c provided at a front right side of the vehicle 1, and a fourth wheel 2d provided at a rear left side of the vehicle 1.

Referring to FIG. 1, the vehicle 1 includes a drive system 10 and a brake system 40.

The drive system 10 generates a driving torque for the vehicle 1 to travel and includes an engine 11, an engine control module or controller 12, and a transmission 21.

The engine 11 may include, for example, but not limited to, a cylinder and a piston and generate the driving torque for the vehicle 1 to travel. The transmission 21 may include a plurality of gears and transmit the driving torque generated by the engine 11 to the wheels 2. In particular, the transmission 21 includes a differential gear for allowing the left wheel 2a and the right wheel 2c to rotate at different rotating speeds by the driving torque of the engine 11.

The engine control module or controller 12 may include an electronic control unit (ECU) for controlling a rotational speed or a revolutions per minute (RPM) and/or driving torque of the engine 11 in response to a driver's acceleration intention through a accelerator pedal 11a.

The brake system 40 generates a braking torque for slowing down or stopping the vehicle 1 and includes brakes 41 and an electronic brake control module (EBCM) or brake control device 100.

As illustrated in FIG. 1, the brake 41 may include a brake caliper 42 installed on the wheel 2 of the vehicle 1. The brake caliper 42 includes a pair of brake pads provided at both opposite sides of a brake disk or rotor 43 coupled to the wheel 2. The brake caliper 42 may press the brake disk 43 from both opposite sides of the brake disk 43 by a fluid pressure or a mechanical force or pressure. Due to the friction between the brake pad of the brake caliper 42 and the brake disk 43, the rotation of the brake disk 43 and the wheel 2 may be stopped or slow down.

In addition, each of the brake calipers 42 may include a wheel cylinder 44a or 44b (see FIG. 2) for receiving a pressurizing medium (e.g., a brake oil) from the brake control device 100 and allowing the brake pad to be in contact with the brake disk by a pressure of the pressurizing medium (hereinafter referred to as "hydraulic pressure").

A wheel speed sensor 180 for generating or outputting an electrical signal corresponding to a rotating speed of each of the wheels 2 is installed adjacent to or provided on each of the wheels 2. The wheel speed sensors 180 may include a first wheel speed sensor 181 for outputting an electrical signal corresponding to a rotating speed of the first wheel 2a, a second wheel speed sensor 182 for outputting an electrical signal corresponding to a rotating speed of the second wheel 2b, a third wheel speed sensor 183 for outputting an electrical signal corresponding to a rotating speed of the third wheel 2c, and a fourth wheel speed sensor 184 for outputting an electrical signal corresponding to a rotating speed of the fourth wheel 2d.

The brake control device 100 may include a hydraulic circuit for supplying hydraulic pressures to the wheel cylinders in response to a driver's braking intention through a brake pedal 101 and a control signal of an ECU for controlling the hydraulic circuit.

The brake control device 100 may control the hydraulic pressures supplied to the wheel cylinders of the brakes 41 to temporarily release the braking of the wheels in response to slips of the wheels 2 caused by the brake of the vehicle 1 (anti-lock brake system (ABS)).

The brake control device 100 may control the hydraulic pressure supplied to one or more of the wheel cylinders of the brake calipers 42 to selectively brake the wheels 2 in response to oversteering and/or understeering during the steering of the vehicle 1 (electronic stability control (ESC)).

In addition, the brake control device 100 may control the rotation of the wheels 2 in response to the spins of the wheels 2 when the vehicle 1 is being driven. For example, in response to the detection of the spins of the wheels 2 when the vehicle 1 starts, the brake control device 100 may control the hydraulic pressure supplied to the wheel cylinder of the brake caliper 42 to temporarily brake the wheels 2. In response to the detection of the spins of the wheels 2 during the traveling of the vehicle 1, the brake control device 100 may control the engine control module 12 to reduce the torque of the engine 11 and also control the hydraulic pressure to be supplied to the wheel cylinder of the brake caliper 42 to temporarily brake the wheels 2.

The drive system 10 and the brake system 40 may communicate with each other through a vehicle communication network. For example, the electric devices may transmit and receive data, signals, and data via Ethernet, media oriented systems transport (MOST), Flexray, controller area network (CAN), local interconnect network (LIN), etc.

For example, the engine control module 12 of the drive system 10 may transmit the RPM of the engine 11, the driving torque of the engine 11, displacement of the accelerator pedal 11a, a gear position of the transmission 21, etc. via the communication network.

The brake control device 100 may receive data including the RPM of the engine 11, the driving torque of the engine 11, the displacement of the accelerator pedal 11a, the gear position of the transmission 21, etc. via the communication network, and control the brakes 41 based on the received data.

Figure 2:
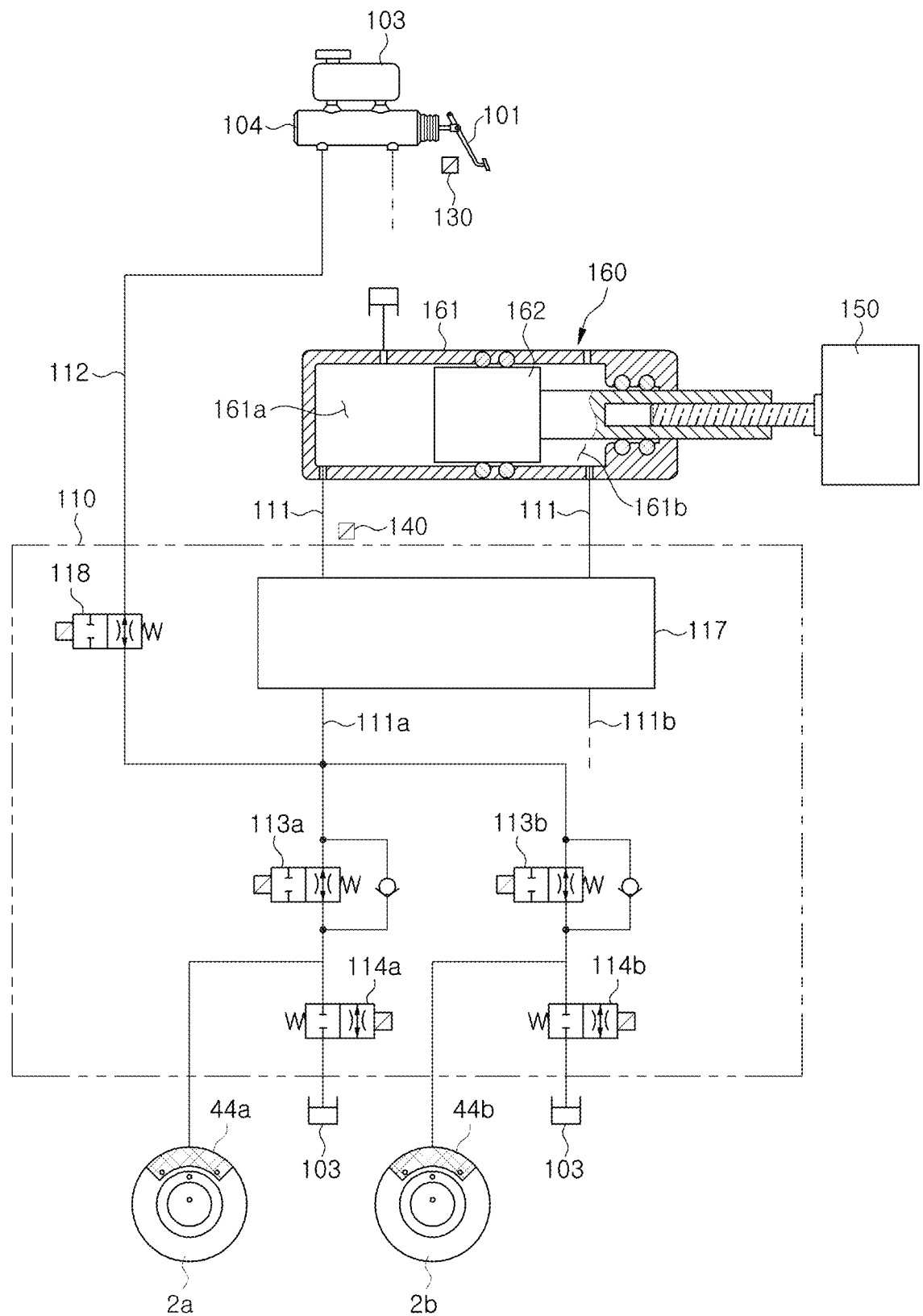
FIG. 2 illustrates a hydraulic circuit of a brake control device according to an embodiment of the present disclosure.

FIG. 2 illustrates a hydraulic circuit of a brake control device according to an embodiment of the present disclosure.

Referring to FIG. 2, a brake pedal 101 configured to acquire or receive the driver's braking intention is provided on the vehicle 1. The brake control device 100 includes a reservoir 103 configured store a pressurizing medium (e.g., a brake oil), a master cylinder 104 configured to generate a hydraulic pressure by the movement or press of the brake pedal 101, a piston pump 160 configured to generate a hydraulic pressure in response to a detection of the movement or displacement of the brake pedal 101, a driving motor 150 configured to drive the piston pump 160, and a hydraulic circuit 110 connecting the master cylinder 104 and/or the piston pump 160 to the wheel cylinders 44a and 44b.

The piston pump 160 may include a cylinder 161 and a piston 162, and an internal space of the cylinder 161 may be partitioned into a first pressure chamber 161a and a second pressure chamber 161b by the piston 162.

The piston pump 160 may generate the hydraulic pressure by moving the piston 162 in response to the movement or displacement of the brake pedal 101. A brake pedal sensor 130 configured to generate or output an electrical signal corresponding to the movement of the brake pedal 101 may be provided in the brake control device 100. The piston 162 of the piston pump 160 may move according to the electrical signal of the brake pedal sensor 130.

The driving motor 150 may generate a torque for moving the piston 162. The rotary torque of the driving motor 150 may be converted into a linear motion force through a power transmission unit (e.g., a plurality of gears, spindles/nuts, and/or pulleys/belts), and the piston 162 may linearly move by the linear motion force converted by the power transmission unit connected between the piston 162 and the driving motor 150.

The hydraulic circuit 110 may hydraulically connect the piston pump 160 to the wheel cylinders 44a and 44b, and selectively transmit or block the hydraulic pressure generated from the piston pump 160 to the wheel cylinders 44a and 44b.

The hydraulic circuit 110 includes a main flow path 111 connecting the piston pump 160 to the wheel cylinders 44a and 44b, and a hydraulic control unit 117, inlet valves 113a and 113b, and outlet valves 114a and 114b are provided on the main flow path 111.

The hydraulic control unit 117 may be hydraulically connected to the first pressure chamber 161a and the second pressure chamber 161b of the piston pump 160, and may include, for example, but not limited to, a plurality of valves. The hydraulic control unit 117 may guide the hydraulic pressure generated by the piston pump 160 to the wheel cylinders 44a and 44b. For example, the hydraulic control unit 117 may guide or transfer the hydraulic pressure generated from the first pressure chamber 161a to the wheel cylinders 44a and 44b while the piston 162 moves forward (e.g. left in FIG. 2) and guide or transfer the hydraulic pressure generated from the second pressure chamber 161b to the wheel cylinders 44a and 44b while the piston 162 moves backward (e.g. right in FIG. 2).

The main flow path 111 may be branched into a first main flow path 111a and a second main flow path 111b at a downstream of the hydraulic control unit 117. The first main flow path 111a may extend from the hydraulic control unit 117 to the first wheel cylinder 44a associated with the first wheel 2a and the second wheel cylinder 44b associated with the second wheel 2b. Although not illustrated in the drawing, the second main flow path 111b may extend to the third wheel cylinder associated with the third wheel 2c and the fourth wheel cylinder associated with the fourth wheel 2d and the second main flow path 111b may have the same or similar components, configurations, and/or connections as the first main flow path 111a.

The inlet valves 113a and 113b and the outlet valves 114a and 114b may be provided on each of the first main flow path 111a and the second main flow path 111b.

The inlet valves 113a and 113b are disposed on each of the main flow paths 111a and 111b connecting the piston pump 160 and the wheel cylinders 44a and 44b. For example, the first inlet valve 113a associated with the first wheel 2a and the second inlet valve 113b associated with the second wheel 2b may be provided on the first main flow path 111a. Although not illustrated in the drawing, a third inlet valve associated with the third wheel 2c and a fourth inlet valve associated with the fourth wheel 2d may be provided on the second main flow path 111b like the first inlet valve 113a and the second inlet valve 113b provided in the first main flow path 111a.

The inlet valves 113a and 113b may selectively allow or block the hydraulic pressures transmitted from the piston pump 160 to the wheel cylinders 44a and 44b. For instance, the inlet valves 113a and 113b may be normally open type solenoid valves.

The outlet valves 114a and 114b are disposed on a flow path connecting the wheel cylinders 44a and 44b and the reservoir 103. The first outlet valve 114a associated with the first wheel 2a and the second outlet valve 114b associated with the second wheel 2b may be provided on the flow path connected to the reservoir 103. Although not illustrated in the drawings, a third outlet valve associated with the third wheel 2c and a fourth outlet valve associated with the fourth wheel 2d may be provided on the flow path connected to the reservoir 103 like the first outlet valve 114a and the second output valve 114b.

The outlet valves 114a and 114b may allow or block the hydraulic pressures of the wheel cylinders 44a and 44b to be or from being discharged to the reservoir 103. For example, the outlet valves 114a and 114b may be normally closed type solenoid valves.

The hydraulic circuit 110 may further include an auxiliary flow path 112 connecting the master cylinder 104 and the wheel cylinder 44a and a cut valve 118 provided on the auxiliary flow path 112.

The cut valve 118 can prevent the hydraulic pressure of the master cylinder 104 from being flowed or provided to the wheel cylinder 44a. That is, the cut valve 118 may selectively block the hydraulic pressure of the master cylinder 104 and selectively allow the hydraulic pressure of the piston pump 160 to be flowed or provided to the wheel cylinder 44a.

When the piston pump 160 is in an abnormal state or a state of being out of order or out of control, the cut valve 118 may be opened to allow the hydraulic pressure of the master cylinder 104 to be flowed or provided to the wheel cylinders 44a and 44b. For instance, the cut valve 118 may be a normally open type solenoid valve that is normally open to allow the connection between the piston pump 160 and the wheel cylinders 44a and 44b in a state in which a power of the cut valve 118 is turned off.

The hydraulic circuit 110 further includes check valves installed at appropriate positions on the flow path to prevent the backflow of the brake oil. The valves included in the brake control device 100, such as the inlet valves 113a and 113b, the outlet valves 114a and 114b, the hydraulic control unit 117, the cut valve 118, and the check valves, may integrally form a valve block.

The brake control device 100 may further include a pressure sensor 140 configured to generate or output an electrical signal corresponding to the hydraulic pressure of the hydraulic circuit 110.

When the driver presses or steps on the brake pedal 101, the piston pump 160 may supply the hydraulic pressure to the wheel cylinders 44a and 44b through the hydraulic control unit 117 and the inlet valves 113a and 113b.

In addition, the brake control device 100 may generate and control the hydraulic pressure for implementing the above-described ABS, ESC, and/or a brake traction control system (BTCS).

Figure 3:
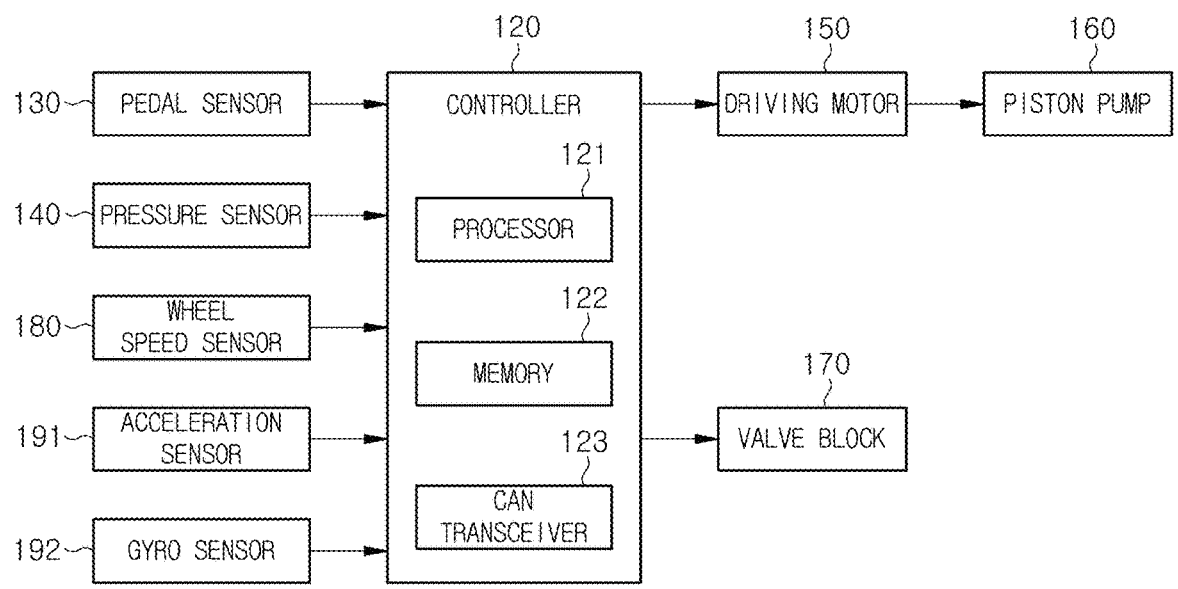
FIG. 3 is a block diagram for illustrating a control configuration of a brake control device according to an embodiment of the present disclosure.

FIG. 3 is a block diagram for illustrating a control configuration of a brake control device according to an embodiment of the present disclosure.

As illustrated in FIG. 3, the vehicle 1 includes the brake pedal sensor 130 configured to generate and output an electrical signal corresponding to the movement or displacement of the brake pedal 101, the wheel speed sensor 180 configured to generate and output an electrical signal corresponding to the rotating speed of the wheel 2, an acceleration sensor 191 configured to generate and output an electrical signal corresponding to an acceleration of the vehicle 1, and a gyro sensor 192.

The brake control device 100 may include the piston pump 160 configured to pressurize and the medium and generate the hydraulic pressure and the hydraulic circuit 110 extending from the piston pump 160 to the wheel cylinders 44a and 44b.

The brake control device 100 may also include the pressure sensor 140 configured to generate and output an electrical signal corresponding to the pressure in the hydraulic circuit 110, the driving motor 150 configured to drive the piston pump 160, a valve block 170 configured to control the hydraulic circuit 110 for guiding the hydraulic pressure generated by the piston pump 160 to the wheel cylinders 44a and 44b, and a controller 120 configured to control the operation of the brake control device 100.

The brake pedal sensor 130 may sense or measure a moving distance and/or a moving speed at which the brake pedal 101 moves according to the driver's braking intention, and generate and provide an electrical output signal (e.g. a pedal signal representative of movement of the brake pedal 101) corresponding to the measured moving distance and/or moving speed of the brake pedal 101 to the controller 120. The controller 120 may identify the driver's braking intention based on the pedal signal of the brake pedal sensor 130.

The pressure sensor 140 may be included in or provided on the hydraulic circuit 110 for guiding the hydraulic pressure of the piston pump 160 to the wheel cylinders 44a and 44b, and detect or measure the hydraulic pressure of the pressurizing medium on the hydraulic circuit 110. The pressure sensor 140 may generate or provide an electrical output signal (e.g. a pressure signal representative of a pressure) corresponding to the measured hydraulic pressure to the controller 120. The controller 120 may identify the hydraulic pressure generated by the master cylinder 104 and/or the piston pump 160 based on the pressure signal of the pressure sensor 140.

A position of the pressure sensor 140 and the number of pressure sensors 140 are not limited to a specific position and a specific number. For example, the pressure sensor 140 may be provided at a position at which the hydraulic pressures generated by the master cylinder 104 and/or the piston pump 160 can be detected. In addition, a sufficient or appropriate number of pressure sensors 140 capable of detecting the hydraulic pressures generated by the master cylinder 104 and/or the piston pump 160 may be provided.

The wheel speed sensor 180 may measure a rotating speed of the wheel 2 provided on the vehicle 1. The wheel speed sensor 180 may be installed on each of the plurality of wheels 2a, 2b, 2c, and 2d and may measure the rotating speed of each of the plurality of wheels 2a, 2b, 2c, and 2d. The wheel speed sensors 180 may include the first wheel speed sensor 181 configured to sense or measure the rotating speed of the first wheel 2a, the second wheel speed sensor 182 configured to sense or measure the rotating speed of the second wheel 2b, the third wheel speed sensor 183 configured to sense or measure the rotating speed of the third wheel 2c, and the fourth wheel speed sensor 184 configured to sense or measure the rotating speed of the fourth wheel 2d. The wheel speed sensor 180 may include, for example, but not limited to, a Hall sensor capable of detecting a magnetic field and a change in the magnetic field or a coil capable of detecting the change in the magnetic field.

The wheel speed sensors 180 may generate and provide electrical signals (e.g. a speed signal representative of a speed) corresponding to the measured rotating speeds of the wheels 2 to the controller 120. For example, the first wheel speed sensor 181 may generate and output the electrical signal corresponding to the rotating speed of the first wheel 2a. The second wheel speed sensor 182 may generate and output the electrical signal corresponding to the rotating speed of the second wheel 2b. The third wheel speed sensor 183 may generate and output the electrical signal corresponding to the rotating speed of the third wheel 2c. In addition, the fourth wheel speed sensor 184 may generate and output the electrical signal corresponding to the rotating speed of the fourth wheel 2d.

The controller 120 may identify the rotating speed of each of the plurality of wheels 2a, 2b, 2c, and 2d based on the speed signal of the wheel speed sensor 180. The controller 120 may calculate or identify a traveling speed of the vehicle 1 based on the speed signals of the wheel speed sensors 180. In addition, the controller 120 may detect or identify the spins of the wheels 2a, 2b, 2c, and 2d based on the rotating speed of each of the plurality of wheels 2a, 2b, 2c, and 2d and the traveling speed of the vehicle 1.

The acceleration sensor 191 may detect a vertical acceleration, a longitudinal acceleration, and a lateral acceleration of the vehicle 1 based on a change in gravitational acceleration acting on the vehicle 1. The acceleration sensor 191 may generate and provide electrical signals corresponding to the vertical acceleration, the longitudinal acceleration, and the lateral acceleration of the vehicle 1 to the controller 120. The longitudinal acceleration may mean acceleration in the direction of travel of the vehicle such as a direction of forward or backward vehicle travel, and the lateral acceleration may mean acceleration acting transversely to the direction of travel of the vehicle.

The gyro sensor 192 may detect a yaw rate, a roll rate, and a pitch rate of the vehicle 1 using rotation inertia. The gyro sensor 192 may provide electrical signals corresponding to the yaw rate, the roll rate, and the pitch rate of the vehicle 1 to the controller 120.

The piston pump 160 may receive the rotating force from the driving motor 150 and generate the hydraulic pressure in response to the received force of the driving motor 150. The piston pump 160 may include, for example, the cylinder 161 and the piston 162 and generate the hydraulic pressure by the movement or displacement of the piston 162 due to the rotation of the driving motor 150.

The driving motor 150 may generate the rotating force in response to a motor control signal of the controller 120. The rotating force generated by the driving motor 150 may be provided to the piston pump 160 and cause the piston pump to linearly move. The driving motor 150 may include, for example, a brushless direct current motor (BLDC motor), a permanent synchronous motor (PMSM), a direct current motor, an induction motor, etc.

The valve block 170 may include the plurality of valves of the brake control device 100. For example, the valve block 170 may include the inlet valves 113a and 113b, the outlet valves 114a and 114b, the hydraulic control unit 117, and the cut valve 118 illustrated in FIG. 2.

The valve block 170 may be configured to selectively open or close the flow path included in the hydraulic circuit 110 in response to a valve control signal (e.g. an opening signal or a closing signal) of the controller 120. For example, as illustrated in FIG. 2, the valve block 170 may provide or form a flow path for guiding the hydraulic pressure from the master cylinder 104 to the wheel cylinders 44a and 44b or provide or form a flow path for guiding the hydraulic pressure from the piston pump 160 to the wheel cylinders 44a and 44b.

The controller 120 may control the driving motor 150 and the valve block 170 based on an output signal (e.g. a pedal signal representative of movement of the pedal 101) of the brake pedal sensor 130, an output signal (e.g. a pressure signal representative of a pressure) of the pressure sensor 140, an output signal (e.g. a wheel speed signal representative of a wheel speed) of the wheel speed sensor 180, and output signals (e.g. acceleration signals) of the acceleration sensor 191 and the gyro sensor 192. In addition, the controller 120 may acquire data related to the traveling of the vehicle 1 from the engine control module 12 via the vehicle communication network and control the driving motor 150 and the valve block 170 based on the data related to the traveling of the vehicle 1.

The controller 120 may include a plurality of semiconductor or electronic elements or components and may be variously called, such as an ECU. The controller 120 includes a controller area network (CAN) transceiver 123, a memory 122, and a processor 121. The CAN transceiver 123, the memory 122, and the processor 121 may be implemented as separate elements or as a single integrated element. The controller 120 may include a plurality of processors and/or a plurality of memories.

The CAN transceiver 123 may receive the data related to the traveling of the vehicle 1 from the engine control module 12 via the vehicle communication network. For example, the CAN transceiver 123 may receive data including the displacement of the accelerator pedal 11a, the driving torque of the engine 11, etc. from the engine control module 12 and transmit the received data to the processor 121.

The memory 122 may store programs, instructions, and data for braking the vehicle 1 depending on the driver's braking intention or a control signal. For example, the memory 122 may store programs, instructions, and data for controlling the driving motor 150 and the valve block 170 to provide the hydraulic pressures to the wheel cylinders 44a and 44b according to the driver's braking intention or the control signal. In addition, the memory 122 may store the programs, instructions and data for controlling the driving motor 150 and the valve block 170 to provide the hydraulic pressures to the wheel cylinders 44a and 44b depending on the displacement of the accelerator pedal 11a and/or the driving torque of the engine 11.

The memory 122 may provide the programs, the instructions, and the data to the processor 121 and store temporary instructions or data generated during a calculation operation of the processor 121.

The memory 122 may include, for example, but not limited to, volatile memories such as a static random access memory (SRAM) and a dynamic RAM (DRAM) and non-volatile memories such as a read only memory (ROM), an erasable programmable ROM (EPROM), and a flash memory. The memory 122 may include one semiconductor or electronic element or component or a plurality of semiconductor or electronic elements or components.

The processor 121 may provide control signals to the driving motor 150 and the valve block 170 according to the programs, instructions, and data provided from the memory 122. For example, the processor 121 may provide a driving signal for generating the hydraulic pressure to the driving motor 150 and provide an opening and/or closing signal for guiding the hydraulic pressure from the piston pump 160 to the wheel cylinders 44a and 44b to the valve block 170.

The processor 121 may include one or more electronic components or circuits such as a calculation circuit, a storage circuit, and a control circuit. The processor 121 may include one semiconductor or electronic component or element or a plurality of semiconductor or electronic components or elements. In addition, the processor 121 may include one core or a plurality of cores inside the single semiconductor element. The processor 121 may be variously called, such as a micro processing unit (MPU).

As described above, the controller 120 may control the driving motor 150 and/or the valve block 170 to brake the vehicle 1 based on the output signal output from the brake pedal sensor 130.

In addition, the controller 120 may control the driving motor 150 and/or the valve block 170 to brake or slow down the rotation of the wheels 2a, 2b, 2c, and 2d based on the output signal output from the wheel speed sensor 180.

The wheel 2 may spin while the vehicle 1 starts or travels on a road having a low friction coefficient. For example, a drive wheel (e.g. a wheel driven by the drive system 10) may spin, and the vehicle 1 may slip without moving forward due to the spin of the wheel 2.

In addition, the wheel 2 may spin while the vehicle 1 starts or travels on a road having a non-uniform friction coefficient (split-$\mu$). For example, either the left drive wheel or the right drive wheel may spin. When any one of the wheels 2 spins, the driving torque of the engine 11 may be biasedly provided to the spun-wheel due to the differential gear. Therefore, the vehicle 1 may slip on the road without moving forward or backward.

The brake control device 100 may control the spins of the wheels in order to increase a traction force (i.e. a force for the vehicle 1 to move) on the road surface having the low friction coefficient or the road surface having the non-uniform friction coefficient.

The controller 120 may detect the spins of the wheels 2 based on a difference in the rotating speeds between the wheels 2a, 2b, 2c, and 2d (e.g., a difference in the rotating speeds between the drive wheels and driven wheels).

When spins of the wheels that are greater than or equal to a predetermined or target spin are detected, the controller 120 may control the driving torque and the braking torque so that the spins of the wheels 2 become less than the predetermined or target spin. For example, the controller 120 may provide the engine control module 12 with a message or instruction for reducing the driving torque of the engine 11 and control the brake control device 100 to apply the braking torque to the corresponding wheel 2 in order to reduce the rotating speed of the wheel 2 of which spin has been detected.

In addition, when the spins of either the left drive wheel or the right drive wheel are detected, the controller 120 may control the brake control device 100 to apply the braking torque to an wheel of which spin has been detected in order to balance the driving torques of the left drive wheels and the right drive wheels.

As described above, the controller 120 may control the brake control device 100 to increase the traction force of the vehicle 1 based on the output signal of the wheel speed sensor 180.

At this time, when any one of the wheel speed sensors 181, 182, 183, and 184 is out of order, malfunctions, or is inoperable or in an abnormal state (hereinafter referred to as "failure"), the controller 120 may not identify or appropriately calculate the rotating speed of a wheel associated with a wheel speed sensor in which the failure has occurred and may not identify or detect the spin of the wheel associated with the wheel speed sensor in which the failure has occurred.

In particular, when the failure or abnormality occurs in the wheel speed sensor associated with the drive wheel, the brake traction control of the brake control device 100 for increasing the traction force of the vehicle 1 may be restricted or may not be allowed to be performed.

For example, when the failure or abnormality occurs in the first wheel speed sensor 181 associated with the first wheel 2a that is the drive wheel, the controller 120 may not identify the spin of the first wheel 2a. At this time, when a spin occurs at the first wheel 2a, which is the drive wheel, without occurring a spin at the third wheel 2c, which is another drive wheel, due to the non-uniform friction coefficient of the road surface, the controller 120 may not execute the brake traction control of the brake control device 100 for increasing the traction force of the vehicle 1.

In order to prevent, suppress, or minimize no execution of the brake traction control, the controller 120 may identify the spin occurring in the drive wheel based on the driving torque of the engine 11 or the rotating speed of the engine 11 of the vehicle 1 when the failure or abnormality occurs in the wheel speed sensor associated with the drive wheel.

For example, a reference torque of the engine 11 corresponding to a respective acceleration of the vehicle 1 may be pre-stored in advance in the memory 122 of the controller 120. The controller 120 may identify the acceleration of the vehicle 1 based on the output signal of the acceleration sensor 191 and search for or identify the reference torque of the engine 11 corresponding to the acceleration of the vehicle 1 from the reference torque stored in the memory 122. The controller 120 may receive the driving torque of the engine 11 from the engine control module 12 and compare the driving torque of the engine 11 with the reference torque corresponding to the acceleration of the vehicle 1. In addition, the controller 120 may detect or identify the spin of the drive wheel based on the driving torque of the engine 11 greater than the reference torque.

Here, the reference torque may be based on a slope or a gradient of the road. That is, the reference torque may increase as the slope or the gradient of an uphill road increases. The memory 122 of the controller 120 may store reference torques of the engine 11 corresponding to accelerations of the vehicle 1 at a plurality of slopes or gradients in advance.

When the spin of the drive wheel is detected, the controller 120 may control the brake control device 100 to apply a braking torque corresponding to the acceleration of the vehicle 1. Here, the braking torque corresponding to the acceleration of the vehicle 1 may be previously stored in the memory 122.

As another example, the controller 120 may identify the rotating speed of the drive wheel based on an output signal of a wheel speed sensor in which no failure has occurred. The controller 120 may receive the rotating speed of the engine 11 from the engine control module 12. The controller 120 may compare the rotating speed of the drive wheel with the rotating speed of the engine 11 and detect or identify the spin of the drive wheel based on the rotating speed of the drive wheel lower than the rotating speed of the engine 11.

When the spin of the drive wheel is detected, the controller 120 may identify the acceleration of the vehicle 1 based on the output signal of the acceleration sensor 191 and control the brake control device 100 to apply the braking torque corresponding to the acceleration of the vehicle 1. Here, the braking torque corresponding to the acceleration of the vehicle 1 may be previously stored in the memory 122.

Figure 4:
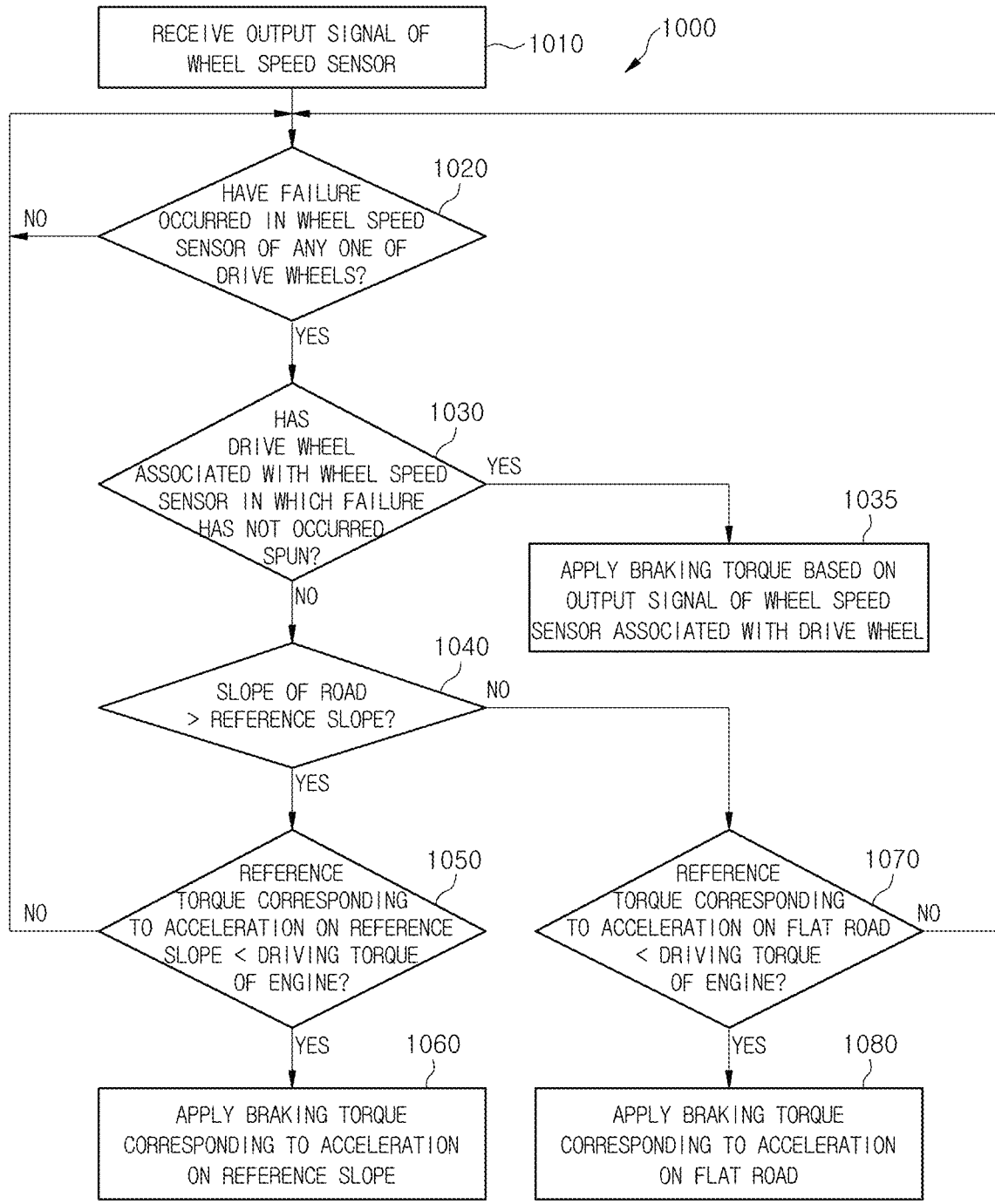
FIG. 4 is a flowchart for illustrating a fail-safe operation of a brake control device according to an embodiment of the present disclosure.
Figure 5:
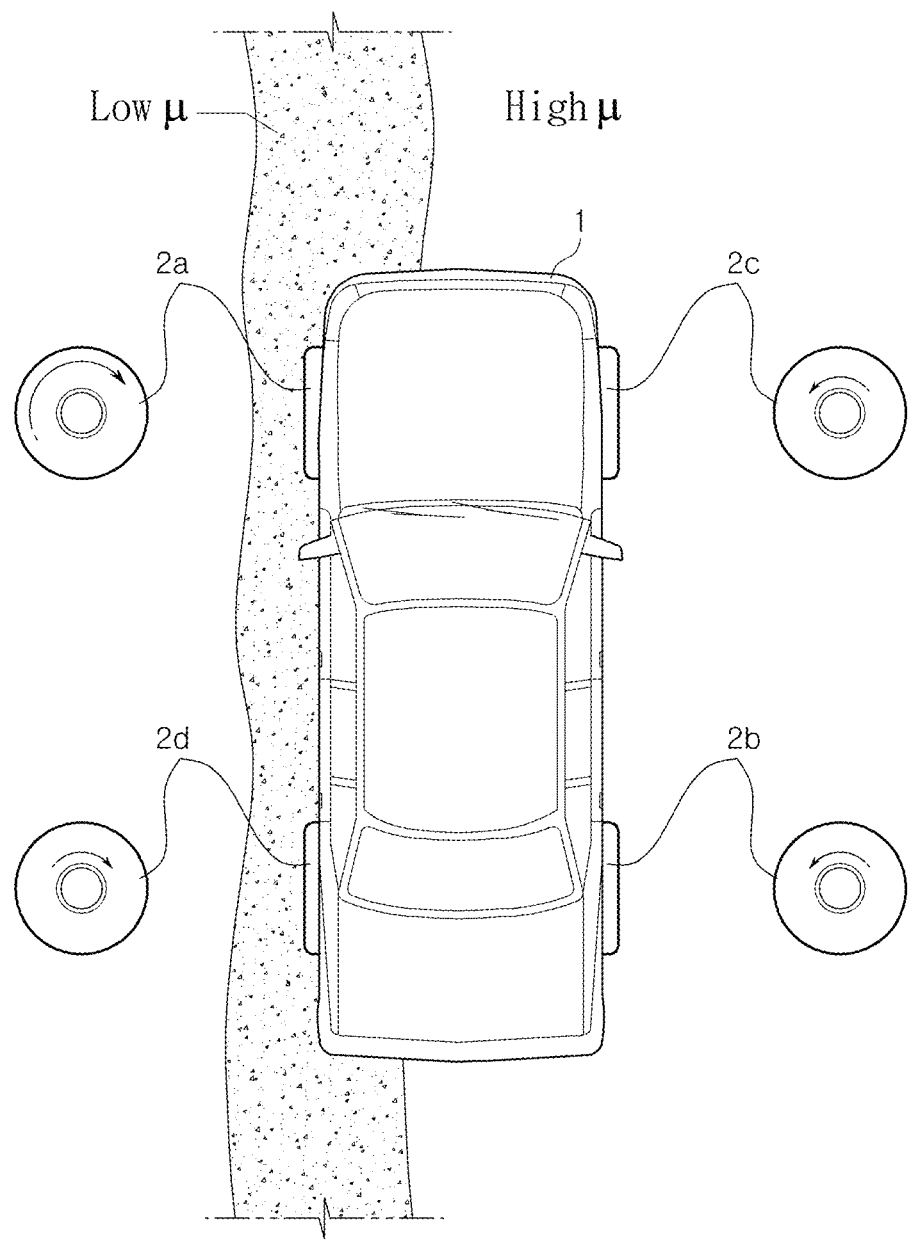
FIG. 5 illustrates one example in which wheels of a vehicle spin.

FIG. 4 is a flowchart for illustrating a fail-safe operation of a brake control device according to an embodiment of the present disclosure. FIG. 5 illustrates one example in which wheels of a vehicle spin.

Fail-safe operations 1000 of the brake control device 100 will be described with reference to FIGS. 4 and 5.

One or some of operations illustrated in FIG. 4 may not be essential operations of the fail-safe operations 1000 of the brake control device 100, and one or some of the operations illustrated in FIG. 4 may be omitted.

The brake control device 100 may receive output signals from the wheel speed sensors 181, 182, 183, and 184 (operation 1010).

Each of the wheel speed sensors 181, 182, 183, and 184 may generate and provide the controller 120 with one of the electrical signals corresponding to the rotating speeds of the wheels 2a, 2b, 2c, and 2d. The controller 120 may determine or identify the rotating speeds of the wheels 2a, 2b, 2c, and 2d based on the output signals of the wheel speed sensors 181, 182, 183, and 184.

The brake control device 100 may determine identify whether a failure in the wheel speed sensor of any one of the drive wheels 2a and 2c has occurred (operation 1020).

The drive wheel may represent a wheel that receives or acquires the driving force from the drive system 10 such as the engine 11, and the driven wheel may represent a wheel that does not receive or acquire the driving force from the drive system 10.

The drive wheels may be, for example, but not limited to, the front wheels 2a, 2c or the rear wheels 2b, 2d. A vehicle in which the front wheels 2a and 2c are drive wheels is called a so-called front-wheel drive vehicle, and a vehicle in which the rear wheels 2b and 2d are drive wheels is called a so-called rear-wheel drive vehicle.

Hereinafter, the vehicle 1 is assumed to be the front-wheel drive vehicle in which the front wheels 2a and 2c are the drive wheels, but some embodiments of the present disclosure may be applied to the rear-wheel drive vehicle.

The controller 120 may identify or determine whether the failure in any one of wheel speed sensors of the drive wheels 2a and 2c based on the output signals of the wheel speed sensors 181 and 183 associated with the front wheels 2a and 2c.

For example, the controller 120 may determine or identify that the failure in any one of the wheel speed sensors 181 and 183 associated with the front wheels 2a and 2c has occurred based on whether the controller 120 receives the output signals of the wheel speed sensors 181 and 183 or whether the received output signals of the wheel speed sensors 181 and 183 are within an effective or predetermined range. In addition, the controller 120 may determine or identify that the output signals of the wheel speed sensors 181 and 183 are not received, the output signals of the wheel speed sensors 181 and 183 are out of the effective or predetermined range, and the failure in the wheel speed sensors 181 and 183 has occurred.

For example, the controller 120 may determine or identify that the failure in the first wheel speed sensor 181 associated with the first wheel 2a has occurred or determine or identify that the failure in the third wheel speed sensor 183 associated with the third wheel 2c has occurred.

When determining or identifying that the failure in any one of the wheel speed sensors of the drive wheels 2a and 2c has not occurred (e.g, NO in operation 1020), the brake control device 100 may repeatedly perform an operation of determining or identifying whether the failure in any one of the wheel speed sensors of the drive wheels 2a and 2c.

The controller 120 may repeat an operation for detecting the failure of the wheel speed sensor 180 based on detection on normality or no failure in the wheel speed sensor 180.

When determining or identifying that the failure in any one of the wheel speed sensors of the drive wheels 2a and 2c has occurred (e.g. YES in 1020), the brake control device 100 may determine or identify whether the drive wheel associated with the wheel speed sensor in which no failure or abnormality occurs has spun (operation 1030).

The controller 120 may receive an electrical signal (e.g. a drive wheel speed signal representative of an wheel speed of a drive wheel) corresponding to a rotating speed of a drive wheel from a normally operating wheel speed sensor among the wheel speed sensors of the drive wheels 2a and 2c. The controller 120 may determine or identify the rotating speed of the drive wheel associated with the normally operating wheel speed sensor based on the received drive wheel speed signal and also determine or identify whether the drive wheel associated with the normally operating wheel speed sensor spins.

For example, the vehicle 1 may travel on a road having a partially different friction coefficient. In an example illustrated in FIG. 5, the left wheels 2a and 2d of the vehicle 1 may be positioned on a road surface having a low friction coefficient (e.g. low p), and the right wheels 2b and 2c of the vehicle 1 may be positioned on a road surface having a high friction coefficient (e.g. high u). Therefore, a spin may occur at the drive wheel (first wheel) 2a provided at the front left side of the vehicle 1.

In this case, when identifying that the failure in the first wheel speed sensor 181 associated with the first wheel 2a, which is a drive wheel, has occurred, the controller 120 may determine or identify whether the third wheel 2c, which is a drive wheel, has spun based on the output signals of the second, third, and fourth wheel speed sensors 182, 183, and 184. For example, the controller 120 may compare the rotating speed of the third wheel 2c, which is a drive wheel, with the rotating speed of the second wheel 2b or the fourth wheel 2d, which is a driven wheel. In addition, the controller 120 may determine or identify that the third wheel 2c has spun when the rotating speed of the third wheel 2c, is a drive wheel, is higher than the rotating speed of the second wheel 2b or the fourth wheel 2d, is a driven wheel, and a difference between the rotating speed of the drive wheel and the rotating speed of the driven wheel is greater than or equal to a predetermined threshold such as an allowable error.

In addition, when determining or identifying that the failure in the third wheel speed sensor 183 associated with the third wheel 2c, which is a drive wheel, has occurred, the controller 120 may identify whether the first wheel 2a, which is a drive wheel, has spun based on output signals of the first, second, and fourth wheel speed sensors 181, 182, and 184 representing wheel speeds of the first, second, and fourth wheels 2a, 2b, and 2d, respectively. For example, the controller 120 may compare the rotating speed of the first wheel 2a, which is a drive wheel, with the rotating speed of the second wheel 2b or the fourth wheel 2d, which is a driven wheel. In addition, the controller 120 may determine or identify that the first wheel 2a has spun when the rotating speed of the first wheel 2a is higher than the rotating speed of the second wheel 2b or the fourth wheel 2d and a difference between the rotating speed of the drive wheel and the rotating speed of the driven wheel is greater than or equal to a predetermined threshold such as an allowable error.

When determining or identifying that the drive wheel associated with the wheel speed sensor in which no failure or abnormality occurs has spun (e.g. YES in operation 1030), the brake control device 100 may apply the braking torque to the drive wheel based on the output signal of the wheel speed sensor associated with the drive wheel (operation 1035).

When determining or identifying that the drive wheel associated with the wheel speed sensor in which no failure or abnormality occurs has spun, the controller 120 may control the brake control device 100 to restrict the spin of the drive wheel.

Specifically, the controller 120 may control the brake control device 100 to apply the braking torque to the drive wheel associated with the wheel speed sensor in which no failure or abnormality occurs based on the output signal of the wheel speed sensor.

For example, in the example illustrated in FIG. 5, in which the failure in the third wheel speed sensor 183 associated with the third wheel 2c occurs, the controller 120 may detect or identify the spin of the first wheel 2a based on the output signal of the first wheel speed sensor 181 in which no failure or abnormality occurs. The controller 120 may control the brake control device 100 based on the spin of the first wheel 2a so that the spin of the first wheel 2a can become smaller than a threshold such as a target spin. Specifically, the controller 120 may control the brake control device 100 to apply the braking torque to the first wheel 2a in which the spin occurs. The controller 120 may control the driving motor 150 to generate a hydraulic pressure corresponding to a required braking torque. In addition, the controller 120 may open the first inlet valve 113a to supply the hydraulic pressure to the first wheel cylinder 44a of the first wheel 2a and close other inlet valves to block the hydraulic pressure from being supplied to the wheel cylinders of other wheels 2b, 2c, and 2d.

When determining or identifying that the drive wheel associated with the wheel speed sensor in which no failure or abnormality occurs has not spun (e.g. NO in operation 1030), the brake control device 100 may determine or identify whether a slope of the road is greater than a reference or predetermined slope (operation 1040).

When determining or identifying that the drive wheel associated with the wheel speed sensor in which no failure or abnormality occurs has not spun, the controller 120 may perform an operation for determining or identifying whether the drive wheel associated with the wheel speed sensor in which the failure has occurred has spun.

For example, in the example illustrated in FIG. 5, in which the failure in the first wheel speed sensor 181 associated with the first wheel 2a occur, the controller 120 may not determine or identify whether the first wheel 2a associated with the first wheel speed sensor 181 in which the failure has occurred has spun. Therefore, the controller 120 may perform an operation for identifying whether the first wheel 2a has spun.

The controller 120 may determine or identify whether the vehicle 1 travels on an uphill road or a downhill road in order to identify whether the first wheel 2a has spun.

Specifically, the controller 120 may identify whether the slope of the road on which the vehicle 1 is traveling is greater than the reference or predetermined slope.

The controller 120 may identify the slope of the road based on the output signal (e.g. an acceleration signal representative of an acceleration) of the acceleration sensor 191. The acceleration sensor 191 may output the acceleration signal including the vertical acceleration, the longitudinal acceleration, and the lateral acceleration. The controller 120 may identify the slope of the road based on the vertical acceleration signal of the acceleration sensor 191. In addition, the controller 120 may correct the acceleration signal of the acceleration sensor 191 using the output signal (e.g. an angular acceleration signal representative of an angular acceleration) of the gyro sensor 192 and/or the output signal (e.g. a speed signal representative of a wheel speed) of the wheel speed sensor 180.

The controller 120 may compare the identified slope of the road with the reference or predetermined slope and identify whether the identified slope of the road is greater than the reference or predetermined slope. The reference slope may be experimentally or empirically preset to identify the slope of, for example, the uphill road or the downhill road.

When determining or identifying that the slope of the road is greater than the reference or predetermined slope (e.g. YES in operation 1040), the brake control device 100 may determine or identify whether the driving torque of the engine 11 is greater than a reference or predetermined torque corresponding to the acceleration of the vehicle 1 at the reference or predetermined slope (operation 1050).

The driving torque (i.e., the reference or predetermined torque) of the engine 11 corresponding to the acceleration of the vehicle 1 when the vehicle 1 is traveling may be pre-stored in the memory 122 of the controller 120. For example, since the driving torque varies depending on a load but a weight of the vehicle 1 can be approximately predicted or identified, the driving torque of the engine 11 for the vehicle 1 to accelerate at a specific acceleration may be previously acquired. A reference torque corresponding to each of a plurality of accelerations may be previously pre-stored in the memory 122 of the controller 120.

In order for the vehicle 1 to travel at a specific acceleration on the uphill road, a driving torque for the uphill road greater than a driving torque for a flat road may be required. For example, a driving torque for the vehicle 1 to accelerate at a specific acceleration at a reference or predetermined slope of the road may be different from a driving torque for the vehicle 1 to accelerate at a specific acceleration on the flat road. A reference torque corresponding to each of the plurality of accelerations at the reference or predetermined slope may be previously pre-stored in the memory 122 of the controller 120.

The controller 120 may identify a longitudinal acceleration of the vehicle 1 based on the acceleration signal of the acceleration sensor 191 and identify a reference torque corresponding to the lateral acceleration of the vehicle 1 at the reference slope based on data stored in the memory 122.

The controller 120 may receive communication signals corresponding to the driving torque of the engine 11 from the engine control module 12 via the communication network and identify the driving torque of the engine 11 based on the received communication signals.

The controller 120 may compare the driving torque of the engine 11 with the reference torque corresponding to the longitudinal acceleration, and identify whether the driving torque of the engine 11 is greater than the reference torque.

As described above, the differential gear may distribute the driving torque of the engine 11 to the first wheel 2a (e.g. a left drive wheel) and the third wheel 2c (e.g. a right drive wheel). In addition, the differential gear may allow the left wheel and the right wheel to rotate at different rotating speeds. At this time, when a spin occurs at the drive wheels 2a and 2c, the driving torque of the engine 11 may be biasedly distributed to the spun wheel by the operation of the differential gear. For example, when the first wheel 2a spins, a greater driving torque may be provided to the first wheel 2a than to the third wheel 2c.

Therefore, when the drive wheel spins, the acceleration of the vehicle 1 may be lower than the acceleration corresponding to the driving torque output from the engine 11. Accordingly, when the drive wheel spins, the driving torque output from the engine 11 to accelerate the vehicle 1 to a specific acceleration needs to be greater than the reference torque (e.g. a driving torque required when the drive wheel does not spin).

The controller 120 may determine or identify whether the drive wheel has spun by identifying whether the driving torque of the engine 11 is greater than the reference torque.

When determining or identifying that the driving torque of the engine 11 is not greater than the reference torque corresponding to the acceleration of the vehicle 1 at the reference slope (e.g. NO in operation 1050), the brake control device 100 may repeatedly perform operation 1020 of identifying whether the failure has occurred in any one of the wheel speed sensors of the drive wheels 2a and 2c.

The controller 120 may determine or identify that the drive wheels 2a and 2c has not spun based on determination that the driving torque of the engine 11 is not greater than the reference torque corresponding to the acceleration of the vehicle 1 at the reference slope. Therefore, the controller 120 may repeat operation 1020 for detecting the failure of the wheel speed sensor 180.

When determining or identifying that the driving torque of the engine 11 is greater than the reference torque corresponding to the acceleration of the vehicle 1 at the reference slope (e.g. YES in operation 1050), the brake control device 100 may apply the reference braking torque corresponding to the acceleration of the vehicle 1 at the reference slope (operation 1060).

The controller 120 may determine or identify that the drive wheels 2a and 2c has spun based on determination that the driving torque of the engine 11 is greater than the reference torque corresponding to the acceleration of the vehicle 1 at the reference slope. Since the controller 120 has determined or identified that the drive wheel associated with the wheel speed sensor in which no failure or abnormality occurs has not spun, the controller 120 may identify that the drive wheel associated with the wheel speed sensor in which the failure or abnormality has occurred has spun. For example, in the example illustrated in FIG. 5, the controller 120 may identify that the failure in the first wheel speed sensor 181 associated with the first wheel 2a has occurred.

When determining or identifying that the drive wheel associated with the wheel speed sensor in which the failure or abnormality has occurred has spun, the controller 120 may control the brake control device 100 to restrict the spin of the drive wheel. Specifically, the controller 120 may control the brake control device 100 to apply a predetermined braking torque to the drive wheel associated with the wheel speed sensor in which the failure or abnormality has occurred in response to the acceleration of the vehicle 1 at the reference slope and the driving torque of the engine 11.

As the spin of the drive wheel increases, a difference between the driving torque of the engine 11 and the reference torque corresponding to the acceleration of the vehicle 1 may increase. That is, the acceleration of the vehicle 1 and the driving torque of the engine 11 may be associated with the spin of the drive wheel. Therefore, the spin of the drive wheel corresponding to the acceleration of the vehicle 1 and the driving torque of the engine 11 may be previously acquired experimentally and be pre-stored. In addition, the braking torque for restricting the spin of the drive wheel corresponding to the acceleration of the vehicle 1 and the driving torque of the engine 11 may also be previously acquired experimentally and be pre-stored.

The braking torque for restricting the spin of the drive wheel corresponding to the acceleration of the vehicle 1 and the driving torque of the engine 11 may be previously pre-stored in the memory 122 of the controller 120.

The controller 120 may determine or identify the braking torque for restricting the spin of the drive wheel corresponding to the longitudinal acceleration of the vehicle 1 at the reference slope and the driving torque of the engine 11 using the data pre-stored in the memory 122.

In addition, the controller 120 may control the brake control device 100 to apply the identified braking torque to the drive wheel. The controller 120 may control the driving motor 150 to generate a hydraulic pressure corresponding to the identified braking torque. In addition, the controller 120 may open the first inlet valve 113a to supply the hydraulic pressure to the first wheel cylinder 44a of the first wheel 2a and close other inlet valves to block the hydraulic pressure from being supplied to the wheel cylinders of other wheels 2b, 2c, and 2d.

When determining or identifying that the slope of the road that the vehicle is traveling is not greater than a reference slope (e.g. NO in operation 1040), the brake control device 100 may determine or identify whether the driving torque of the engine 11 is greater than the reference torque corresponding to the acceleration of the vehicle 1 on the flat road (operation 1070).

A driving torque (i.e., a reference or predetermined torque) of the engine 11 corresponding to a respective acceleration of the vehicle 1 when the vehicle 1 travels on the flat road may be pre-stored in the memory 122 of the controller 120.

The controller 120 may determine or identify the longitudinal acceleration of the vehicle 1 based on the acceleration signal of the acceleration sensor 191, and identify the reference torque corresponding to the longitudinal acceleration of the vehicle 1 on the flat road based on data stored in the memory 122.

The controller 120 may receive communication signals corresponding to the driving torque of the engine 11 from the engine control module 12 via the communication network, and identify the driving torque of the engine 11 based on the received communication signals.

The controller 120 may compare the driving torque of the engine 11 with the reference torque corresponding to the longitudinal acceleration of the vehicle 1, and determine or identify whether the driving torque of the engine 11 is greater than the reference or predetermined torque.

As described above, the controller 120 may determine or identify whether the drive wheel has spun by determining or identifying whether the driving torque of the engine 11 is greater than the reference or predetermined torque.

When determining or identifying that the driving torque of the engine 11 is not greater than the reference or predetermined torque corresponding to the acceleration of the vehicle 1 on the flat road (e.g. NO in operation 1070), the brake control device 100 may repeatedly perform operation 1020 of identifying whether the failure in any one of the wheel speed sensors of the drive wheels 2a and 2c has occurred.

When determining or identifying that the driving torque of the engine 11 is greater than the reference or predetermined torque corresponding to the acceleration of the vehicle 1 on the flat road (e.g. YES in operation 1070), the brake control device 100 may apply the braking torque corresponding to the acceleration of the vehicle 1 at the reference slope (operation 1080).

The controller 120 may determine or identify that at least one of the drive wheels 2a and 2c has spun based on determination that the driving torque of the engine 11 is greater than the reference or predetermined torque corresponding to the acceleration of the vehicle 1 on the flat road.

When determining or identifying that the drive wheel associated with the wheel speed sensor in which the failure or abnormality has occurred has spun, the controller 120 may control the brake control device 100 to restrict the spin of the drive wheel. For instance, the controller 120 may control the brake control device 100 to apply the predetermined braking torque to the drive wheel associated with the wheel speed sensor in which the failure or abnormality has occurred in response to the acceleration of the vehicle 1 and the driving torque of the engine 11 at the reference slope. The braking torque for restricting the spin of the drive wheel corresponding to the acceleration of the vehicle 1 and the driving torque of the engine 11 may be previously pre-stored in the memory 122 of the controller 120. The controller 120 may determine or identify the braking torque for restricting the spin of the drive wheel corresponding to the longitudinal acceleration of the vehicle 1 at the reference slope and the driving torque of the engine 11 based on the data pre-stored in the memory 122 and control the brake control device 100 to apply the identified braking torque to the drive wheel.

As described above, when determining or identifying that the failure in the wheel speed sensor 180 has occurred, the brake control device 100 may restrict the speed of the drive wheel based on the acceleration of the vehicle 1 and the driving torque of the engine 11. Therefore, even when the failure in the wheel speed sensor 180, the brake control device 100 can increase the traction force of the vehicle 1.

Figure 6:
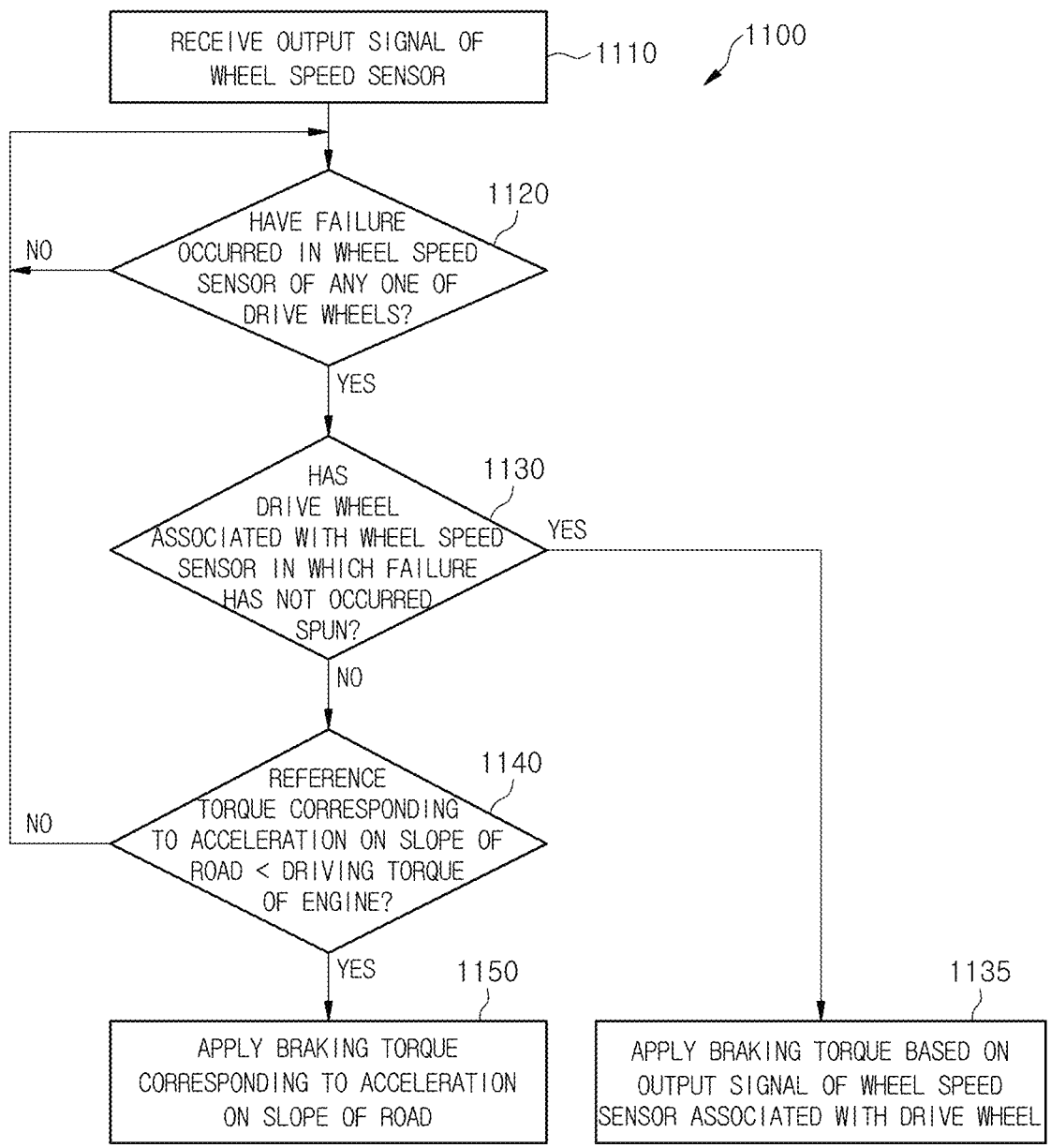
FIG. 6 is a flowchart for illustrating a fail-safe operation of a brake control device according to another embodiment of the present disclosure.

FIG. 6 is a flowchart for illustrating a fail-safe operation of a brake control device according to another embodiment of the present disclosure.

Fail-safe operations 1100 of the brake control device 100 will be described with reference to FIG. 6.

One or some of operations illustrated in FIG. 6 may not be essential operations of the fail-safe operations 1100 of the brake control device 100, and one or some of the operations illustrated in FIG. 6 may be omitted.

The brake control device 100 may receive output signals of the wheel speed sensors 181, 182, 183, and 184 (operation 1110).

Operation 1110 of FIG. 6 may be the same as or similar to operation 1010 described with reference to FIG. 4.

The brake control device 100 may identify whether the failure in any one of the wheel speed sensors the drive wheels 2a and 2c has occurred (operation 1120).

Operation 1120 of FIG. 6 may be the same as or similar to operation 1020 described with reference to FIG. 4.

When determining or identifying that the failure in any one of the wheel speed sensors of the drive wheels 2a and 2c has occurred (e.g. YES in operation 1120), the brake control device 100 may identify whether the drive wheel associated with the wheel speed sensor in which no failure occurs has spun (operation 1130). When determining or identifying that the drive wheel associated with the wheel speed sensor in which no failure occurs has spun (e.g. YES in operation 1130), the brake control device 100 may apply the braking torque to the drive wheel based on the output signal of the wheel speed sensor associated with the drive wheel (operation 1135).

Operations 1130 and 1135 of FIG. 6 may be the same as or similar to operations 1030 and 1035 described with reference to FIG. 4.

When determining or identifying that the drive wheel associated with the wheel speed sensor in which no failure occurs has not spun (e.g. NO in operation 1130), the brake control device 100 may determine or identify whether the driving torque of the engine 11 is greater than a reference torque corresponding to the acceleration of the vehicle 1 at the slope of the road (operation 1140).

When determining or identifying that the drive wheel associated with the wheel speed sensor in which no failure occurs has not spun, the controller 120 may perform an operation for identifying whether the drive wheel associated with the wheel speed sensor in which the failure has occurred has spun.

The controller 120 may determine or identify the slope of the road on which the vehicle 1 travels in order to identify whether the drive wheel associated with the wheel speed sensor in which the failure has occurred has spun. The controller 120 may identify the slope of the road based on the output signal (e.g. an acceleration signal representative of acceleration of the vehicle 1) of the acceleration sensor 191.

The driving torque (e.g., a reference or predetermined torque) of the engine 11 corresponding to the acceleration of the vehicle 1 when the vehicle 1 travels on road at different slopes may be stored in the memory 122 of the controller 120. In particular, reference torques of the engine 11 corresponding to different accelerations may be pre-stored in the memory 122.

The controller 120 may identify the longitudinal acceleration of the vehicle 1 based on the acceleration signal of the acceleration sensor 191 and identify the reference torque corresponding to the longitudinal acceleration of the vehicle 1 at the slope of the road on which the vehicle 1 travels based on the data pre-stored in the memory 122.

The controller 120 may receive communication signals corresponding to the driving torque of the engine 11 from the engine control module 12 via the communication network and identify the driving torque of the engine 11 based on the received communication signals.

The controller 120 may compare the driving torque of the engine 11 with the reference torque corresponding to the longitudinal acceleration of the vehicle 1 and identify whether the driving torque of the engine 11 is greater than the reference torque. The controller 120 may determine or identify whether the drive wheel has spun by identifying whether the driving torque of the engine 11 is greater than the reference or predetermined torque.

When determining or identifying that the driving torque of the engine 11 is not greater than the reference torque corresponding to the acceleration of the vehicle 1 at the identified slope of the road (e.g. NO in operation 1140), the brake control device 100 may repeatedly perform operation 1120 of identifying whether the failure in any one of the wheel speed sensors of the drive wheels 2a and 2c has occurred.

When determining or identifying that the driving torque of the engine 11 is greater than the reference torque corresponding to the acceleration of the vehicle 1 at the identified slope of the road (e.g. YES in operation 1140), the brake control device 100 may apply the braking torque corresponding to the acceleration of the vehicle 1 at the identified slope of the road (operation 1150).

The controller 120 may determine or identify that at least one of the drive wheels 2a and 2c has spun based on determination that the driving torque of the engine 11 is greater than the reference torque corresponding to the acceleration of the vehicle 1 at the identified slope of the road.

When determining or identifying that the drive wheel associated with the wheel speed sensor in which the failure has occurred has spun, the controller 120 may control the brake control device 100 to restrict the spin of the drive wheel. For example, the controller 120 may control the brake control device 100 to apply the predetermined braking torque to the drive wheel associated with the wheel speed sensor in which the failure has occurred in response to the acceleration of the vehicle 1 and the driving torque of the engine 11 at the identified slope of the road.

As described above, when determining or identifying that the failure in the wheel speed sensor 180 has occurred, the brake control device 100 may restrict the speed of the drive wheel based on the acceleration of the vehicle 1 and the driving torque of the engine 11. Therefore, even when the failure or abnormality in the wheel speed sensor 180 occurs, the brake control device 100 can increase the traction force of the vehicle 1.

Figure 7:
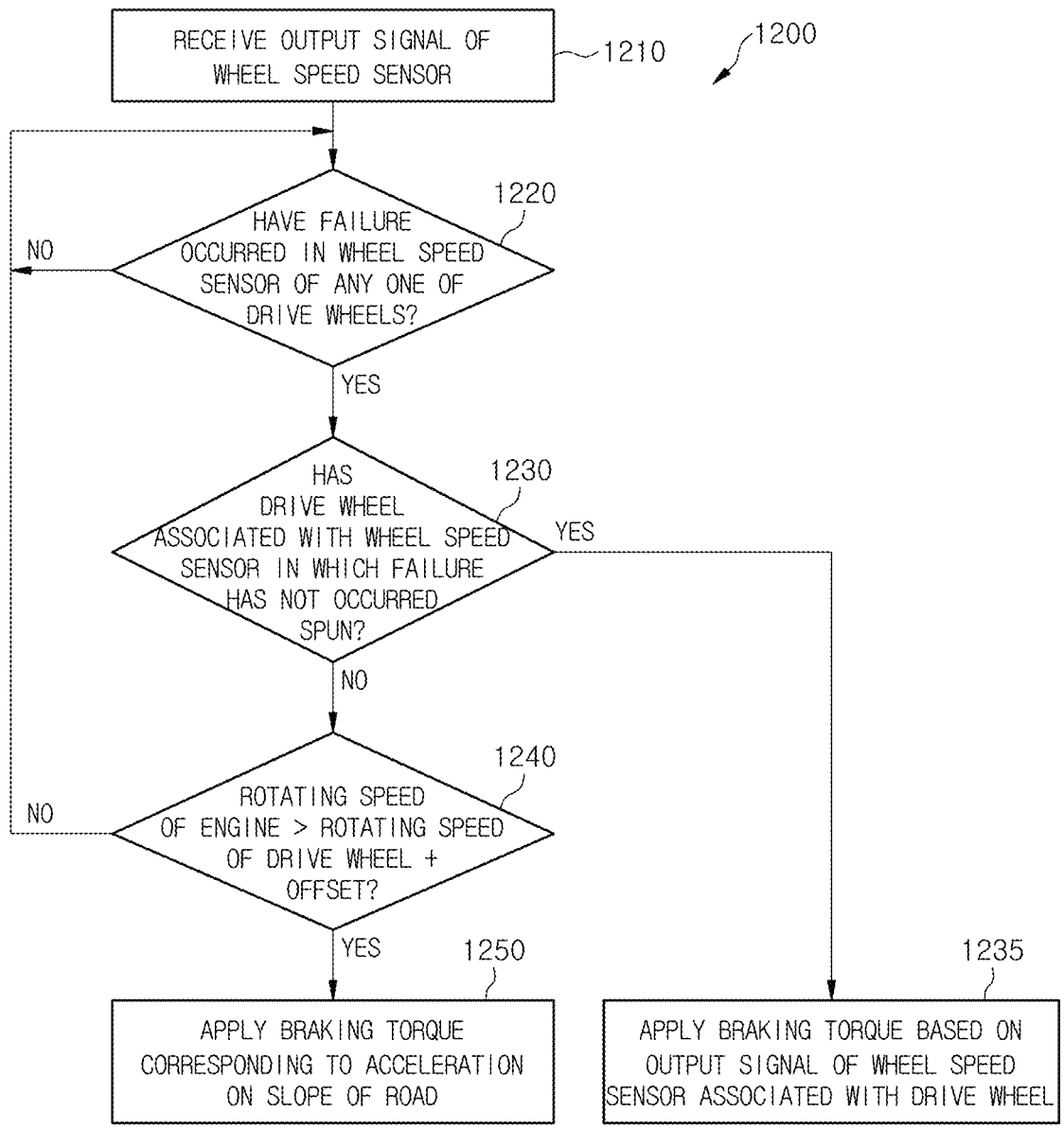
FIG. 7 is a flowchart for illustrating a fail-safe operation of a brake control device according to still another embodiment of the present disclosure.

FIG. 7 is a flowchart for illustrating a fail-safe operation of a brake control device according to still another embodiment of the present disclosure.

Fail-safe operations 1200 of the brake control device 100 will be described with reference to FIG. 7.

One or some of operations illustrated in FIG. 7 may not be essential operations of the fail-safe operations 1200 of the brake control device 100, and one or some of the operations illustrated in FIG. 7 may be omitted.

The brake control device 100 may receive output signals of the wheel speed sensors 181, 182, 183, and 184 (operation 1210).

Operation 1210 of FIG. 7 may be the same as or similar to operation 1010 described with reference to FIG. 4.

The brake control device 100 may determine or identify whether the failure in any one of the wheel speed sensors of the drive wheels 2a and 2c (operation 1220).

Operation 1220 of FIG. 7 may be the same as or similar to operation 1020 described with reference to FIG. 4.

When determining or identifying that the failure in any one of the wheel speed sensors of the drive wheels 2a and 2c (e.g. YES in operation 1220), the brake control device 100 may determine or identify whether the drive wheel associated with the wheel speed sensor in which no failure occurs has spun (operation 1230). When determining or identifying that the drive wheel associated with the wheel speed sensor in which no failure or abnormality occurs has spun (e.g. YES in operation 1230), the brake control device 100 may apply the braking torque to the drive wheel based on the output signal of the wheel speed sensor associated with the drive wheel (operation 1235).

Operations 1230 and 1235 of FIG. 7 may be the same as or similar to operations 1030 and 1035 described with reference to FIG. 4.

When determining or identifying that the drive wheel associated with the wheel speed sensor in which no failure or abnormality occurs has not spun (e.g. NO in operation 1230), the brake control device 100 may identify whether the sum of the measured rotating speed of the drive wheel and an offset is smaller than a reference or predetermined speed of the drive wheel associated with the rotation of the engine 11 (operation 1240).

The controller 120 may receive communication signals corresponding to the rotating speed of the engine 11 from the engine control module or controller 12 via the vehicle communication network, and determine or identify the rotating speed of the engine 11 corresponding to the received communication signals. In addition, the controller 120 may receive communication signals corresponding to a gear ratio of the transmission 21 from the transmission 21 via the vehicle communication network, and determine or identify the gear ratio of the transmission 21 corresponding to the received communication signals.

The controller 120 may identify a reference speed of the drive wheels 2a and 2c associated with the rotation of the engine 11 based on the rotating speed of the engine 11 and/or the gear ratio of the transmission 21. For example, the controller 120 may determine or identify the reference speed of the drive wheels 2a and 2c based on multiplying the rotating speed of the engine 11 by the gear ratio of the transmission 21.

The controller 120 may determine or identify the rotating speed of the drive wheel based on the output signal of the wheel speed sensor in which no failure or abnormality occurs. For example, when determining or identifying that the failure or abnormality in the first wheel speed sensor 181 associated with the first wheel 2a has occurred, the controller 120 may determine or identify the rotating speed of the third wheel 2c based on the output signal of the third wheel speed sensor 183.

The controller 120 may compare the sum of the identified rotation speed of the drive wheel and the offset with the reference speed of the drive wheels 2a and 2c associated with the rotation of the engine 11.

As described above, the differential gear may distribute the driving torque of the engine 11 to the first wheel (left drive wheel) 2a and the third wheel (right drive wheel) 2c. In addition, the differential gear may allow the left wheel and the right wheel to rotate at different rotating speeds. At this time, when the drive wheels 2a and 2c spin, the driving torque of the engine 11 may be biasedly distributed to the spun wheel by the operation of the differential gear. For example, when the first wheel 2a spins, a greater driving torque may be provided to the first wheel 2a than the third wheel 2c, and the first wheel 2a may rotate faster than the third wheel 2c.

Therefore, when the drive wheel spins, a rotating speed of the non-spun drive wheel may be slower than the rotating speed of the spun drive wheel. Furthermore, when the drive wheel spins, the rotating speed of the non-spun drive wheel may be slower than the reference speed associated with the rotation of the engine 11.

The controller 120 may determine or identify whether the drive wheel has spun by identifying or determining whether the sum of the rotating speed of the drive wheel and the offset is smaller than the reference speed associated with the rotation of the engine 11. Here, the offset may be experimentally or empirically preset and may include, for example, but not limited to, an allowable error.

When determining or identifying that the sum of the measured rotating speed of the drive wheel and the offset is not smaller than the reference speed of the drive wheel associated with the rotation of the engine 11 (e.g. NO in operation 1240), the brake control device 100 may repeatedly perform operation 1220 of determining or identifying whether the failure in any one of the wheel speed sensors of the drive wheels 2a and 2c has occurred.

When identifying that the sum of the measured rotating speed of the drive wheel and the offset is smaller than the reference speed of the drive wheel associated with the rotation of the engine 11 (e.g. YES in operation 1240), the brake control device 100 may apply the braking torque corresponding to the acceleration of the vehicle 1 at the identified slope of the road (operation 1250).

The controller 120 may determine or identify that the drive wheels 2a and 2c have spun based on the sum of the measured rotating speed of the drive wheel and the offset smaller than the reference speed of the drive wheel associated with the rotation of the engine 11.

When determining or identifying that the drive wheel associated with the wheel speed sensor in which the failure or abnormality has occurred has spun, the controller 120 may control the brake control device 100 to restrict the spin of the drive wheel. Specifically, the controller 120 may control the brake control device 100 to apply a predetermined braking torque to the drive wheel associated with the wheel speed sensor in which the failure or abnormality has occurred in response to the measured rotating speed of the drive wheel and the reference speed of the drive wheel at the identified slope of the road.

As the spin of the drive wheel increases, the difference between the measured rotating speed of the drive wheel and the reference speed of the drive wheel may increase. Accordingly, the measured rotating speed of the drive wheel and the reference speed of the drive wheel may be associated with the spin of the drive wheel. Therefore, the spin of the drive wheel corresponding to the measured rotating speed of the drive wheel and the reference speed of the drive wheel may be previously acquired experimentally and be pre-stored. In addition, the braking torque for restricting the spin of the drive wheel corresponding to the measured rotating speed of the drive wheel and the reference speed of the drive wheel may also be previously acquired experimentally and be pre-stored.

The measured rotating speed of the drive wheel and the braking torque for restricting the spin of the drive wheel corresponding to the reference speed of the drive wheel may be previously pre-stored in the memory 122 of the controller 120.

The controller 120 may determine or identify the braking torque for restricting the spin of the drive wheel corresponding to the measured rotating speed of the drive wheel and the reference speed of the drive wheel at the measured slope of the road based on the data pre-stored in the memory 122.

As is apparent from the above description, when determining or identifying that the failure or abnormality in the wheel speed sensor 180 has occurred, the brake control device 100 may restrict the speed of the drive wheel based on the acceleration of the vehicle 1 and the driving torque of the engine 11. Therefore, even when the failure or abnormality in the wheel speed sensor 180 occurs, the brake control device 100 can increase the traction force of the vehicle 1.

According to an aspect of the present disclosure, it is possible to provide an apparatus capable of preventing, suppressing, or minimizing left-right asymmetrical spins of wheels of a vehicle in a state in which a wheel speed sensor is out of order, inoperable, or in an abnormal state, and a method of controlling the same.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A brake apparatus comprising:
   a brake configured to provide a braking torque to first and second wheels of a vehicle; and
   a processor configured to:
   identify a driving torque of the vehicle based on an output of an engine of the vehicle;
   identify a reference driving torque based on a longitudinal acceleration of the vehicle;
   in response to identifying a failure of a first wheel speed sensor of the first wheel based on a first signal output from the first wheel speed sensor, identify whether the first wheel spins based on the driving torque of the vehicle and the reference driving torque, and identify whether the second wheel spins based on one or more output signals from one or more of a second wheel speed sensor of the second wheel, a third wheel speed sensor of a third wheel or a fourth wheel speed sensor of a fourth wheel which are not identified as a failure; and
   control the brake in response to identifying that at least one wheel of the first and second wheels spins.

2. The brake apparatus of claim 1, wherein the processor is configured to control the brake to provide at least one wheel of the first and second wheels with a braking torque determined based on the driving torque of the vehicle and the reference driving torque.

3. The brake apparatus of claim 1, wherein the processor is configured to:
   identify a slope of a road on which the vehicle travels based on a vertical acceleration of the vehicle; and
   identify the reference driving torque based on the identified slope of the road and the longitudinal acceleration of the vehicle.

4. The brake apparatus of claim 3, wherein the processor is configured to, responsive to identifying that at least one wheel of the first and second wheels spins, control the brake to provide at least one wheel of the first and second wheels with a braking torque determined based on the identified slope of the road and the longitudinal acceleration of the vehicle.

5. The brake apparatus of claim 1, wherein the processor is configured to:
   identify a rotating speed of the second wheel based on a second signal output from a second wheel speed sensor associated with the second wheel; and
   identify that at least one of the first and second wheels spins based on whether the second wheel spins.

6. The brake apparatus of claim 5, wherein the processor is configured to, responsive to identifying that the second wheel does not spin based on the second signal output from the second wheel speed sensor, identify whether the first wheel spines based on the determination that the driving torque of the vehicle is greater than the reference driving torque.

7. The brake apparatus of claim 6, wherein the processor is configured to control the brake to provide the first wheel with a braking torque determined based on the driving torque of the vehicle and the reference driving torque.

8. The brake apparatus of claim 5, wherein the processor is configured to, responsive to identifying that the second wheel spins based on the second signal output from the second wheel speed sensor, control the brake to provide the second wheel with a predetermined braking torque corresponding to a spin of the second wheel.

9. A method of controlling a brake configured to provide a braking torque to first and second wheels of a vehicle, the method comprising:
   identifying a driving torque of the vehicle based on an output of an engine of the vehicle;
   identifying a reference driving torque based on a longitudinal acceleration of the vehicle;
   in response to identifying a failure of a first wheel speed sensor of the first wheel based on a first signal output from the first wheel speed sensor identifying whether the first wheel spins based on the driving torque of the vehicle and the reference driving torque and identifying whether the second wheel spins based on one or more output signals from one or more of a second wheel speed sensor of the second wheel, a third wheel speed sensor of a third wheel or a fourth wheel speed sensor of a fourth wheel which are not identified as a failure; and
   controlling the brake in response to identifying that at least one wheel of the first and second wheels spins.

10. The method of claim 9, further comprising controlling the brake to provide at least one wheel of the first and second wheels with a braking torque determined based on the driving torque of the vehicle and the reference driving torque.

11. The method of claim 9, wherein the identifying of the reference driving torque comprises:
    identifying a slope of a road on which the vehicle travels based on a vertical acceleration of the vehicle; and
    identifying the reference driving torque based on the identified slope of the road and the longitudinal acceleration of the vehicle.

12. The method of claim 11, further comprising, responsive to identifying that at least one wheel of the first and second wheels spins, controlling the brake to provide at least one wheel of the first and second wheels with a braking torque determined based on the identified slope of the road and the longitudinal acceleration of the vehicle.

13. The method of claim 9, wherein the identifying that at least one of the first and second wheels spins comprises:

identifying a rotating speed of the second wheel based on a second signal output from a second wheel speed sensor associated with the second wheel; and identifying that at least one of the first and second wheels spins based on whether the second wheel spins.

14. The method of claim 13, wherein the identifying that at least one of the first and second wheels spins further comprises, responsive to identifying that the second wheel does not spin based on the second signal output from the second wheel speed sensor, identifying whether the first wheel spines based on the determination that the driving torque is greater than the reference driving torque.

15. The method of claim 14, further comprising controlling the brake to provide first wheel with a braking torque determined based on the driving torque and the reference driving torque.

16. The method of claim 13, further comprising, responsive to identifying that the second wheel spins based on the second signal output from the second wheel speed sensor, controlling the brake to provide the second wheel with a predetermined braking torque corresponding to a spin of the second wheel.

17. An apparatus comprising:
a brake configured to provide a hydraulic pressure to a first wheel cylinder associated with a first wheel of a vehicle and a second wheel cylinder associated with a second wheel of the vehicle; and
a processor configured to:
identify a driving torque of the vehicle based on an output of an engine of the vehicle;
identify a reference driving torque based on a longitudinal acceleration of the vehicle;
in response to identifying a failure of a first wheel speed sensor of the first wheel based on a first signal output from the first wheel speed sensor, identify whether a spin of at least one wheel of the first wheel spins based on the driving torque of the vehicle and the reference driving torque, and identify whether the second wheel spins based on output signals from a second wheel speed sensor of the second wheel, a third wheel speed sensor of a third wheel and a fourth wheel speed sensor of a fourth wheel; and
control the brake to provide the hydraulic pressure to the first wheel cylinder associated with the first wheel in response to the identifying that the first wheel spins.

18. The apparatus of claim 17, wherein the processor is configured to, responsive to identifying that the second wheel does not spin based on the second signal output from the second wheel speed sensor, identify the spin of the first wheel based on determination that the rotating speed of the second wheel is lower than the reference speed of the drive wheel identified based on the output associated with the engine.

19. The apparatus of claim 18, wherein the processor is configured to:
identify a slope of a road on which the vehicle travels based on a vertical acceleration of the vehicle; and
control the brake to apply a braking torque, determined based on the identified slope of the road and the longitudinal acceleration of the vehicle, to the first wheel.

20. The apparatus of claim 17, wherein the processor is configured to, responsive to identifying that the second wheel spins based on the second signal output from the second wheel speed sensor, control the brake to apply a predetermined braking torque, which corresponds to the spin of the second wheel, to the second wheel.

* * * * *